United States Patent [19]
Kawamura et al.

[11] Patent Number: 4,934,988
[45] Date of Patent: Jun. 19, 1990

[54] BELT TENSIONER

[75] Inventors: Motoshi Kawamura; Nobuhiro Ikeuchi; Takashi Tsutsui, all of Osaka, Japan

[73] Assignee: Koyo Seiko Co., Ltd., Osaka, Japan

[21] Appl. No.: 409,783

[22] Filed: Sep. 20, 1989

[30] Foreign Application Priority Data

Sep. 22, 1988 [JP] Japan .............................. 63-238038
Apr. 24, 1989 [JP] Japan .............................. 1-47786[U]
Jun. 27, 1989 [JP] Japan .............................. 1-75390[U]

[51] Int. Cl.$^5$ ............................................ F16H 7/08
[52] U.S. Cl. ................................. 474/117; 474/135
[58] Field of Search ................... 474/101, 109-111, 474/113-117, 133, 135

[56] References Cited

U.S. PATENT DOCUMENTS

| | | | |
|---|---|---|---|
| 4,596,538 | 6/1986 | Henderson | 474/135 |
| 4,689,037 | 8/1987 | Bytzek | 474/135 |
| 4,698,049 | 10/1987 | Bytzek et al. | 474/135 |
| 4,822,322 | 4/1989 | Martin | 474/135 |
| 4,826,471 | 5/1989 | Ushio | 474/135 |
| 4,834,694 | 5/1989 | Martin | 474/135 |

Primary Examiner—Thuy M. Bui
Attorney, Agent, or Firm—Birch, Stewart, Kolasch & Birch

[57] ABSTRACT

A belt tensioner comprises a support fixed relative to a belt, a belt engagement device including a pulley being carried by the support and being movable relative to the support, a mechanical spring operatively associated with the support and the belt engagement device for urging the pulley against the belt to tension the belt, and a frictional dampening element operatively associated with the support and the belt engagement device to dampen the movement of the belt engagement device relative to the support in at least one direction of movement. The support being fixed to a fixed portion and including a shaft. The belt engagement device is engaged rotatably around the shaft.

The dampening element includes one or more holes in the belt engagement device facing the support, a friction element is movably positioned in each hole and in contact with the surface of the support, and an urging element is positioned in each hole for urging the friction element toward the support to press the friction element toward the support.

5 Claims, 6 Drawing Sheets

BELT TENSIONER

BACKGROUND OF THE INVENTION

The present invention relates to a belt tensioner and more particularly, to an improved belt tensioner utilized in a power transmission belt drive system or a timing belt drive system of an automobile engine.

The conventional belt tensioner for an endless belt utilized in a power transmission belt drive system or a timing belt drive system comprises a support means for being stationary relative to the belt, a belt engaging means carried by the support means and being movable relative to the support means, a mechanical spring means operatively associated with the support means and the belt engaging means for urging the belt engaging means relative to the support means and against the belt with a force to tension the belt, and a friction dempening means operatively associated with the support means and the belt engaging means and dampening the movement of the belt engaging means relative to the support means in at least one direction. The dampening means has a longitudinal axis and the support means has a shaft means having a longitudinal axis and being fixed from movement relative to the belt engaging means. The belt engaging means has a portion rotatably carried by the shaft means whereby the engaging means is rotatable relative to the shaft means. The spring means has a longitudinal axis around which the spring means is wound. The shaft means is provided the dampening means and the spring means in an adjacent position along its longitudinal axis. For example, see U.S. Pat. No. 4,689,037 to Bytzek or U.S. Pat. No. 4,698,049 to Bytzek et al.

In the conventional tensioner, therefore, in order to adjust the spring force of the mechanical spring means, it is necessary to adjust simultaneously both the force along the rotation direction (the twist force of the coil spring) for biasing the belt engaging means and the longitudinal force for biasing the frictional dampening means, resulting in a difficult adjusting.

Accordingly, it has been proposed that a second mechanical spring means for urging the dampening means is interposed between the belt engaging means and the support means, and, in addition, the second mechanical spring means is positioned on the shaft means, being adjacent to the dampening means. The object of such an arrangement is that the second mechanical spring means for urging the dampening means is separated from the first mechanical spring means for urging the belt engaging means, whereby the spring force can be independently adjusted. For example, see U.S. Pat. No. 4,596,538 to Henderson.

However, some problems still remain as follows. Since an annular wavy metallic spring is utilized as a second mechanical spring means in the belt tensioner as shown in U.S. Pat. No. 4,596,538 and has the characteristics that small deformation of the spring changes the spring force remarkably, the spring force is abruptly eliminated, when the frictional face of the dampening means is worn away by long-term operation, and it is dificult to assemble the belt tensioner so that the second mechanical spring means may give the dampening means a suitable force.

SUMMARY OF THE INVENTION

Accordingly, it is an object of the present invention to provide an improved belt tensioner with a dampening mechanism that offers a uniform spring force toward a frictional dampening means continuously and stabilizes the spring force applied to the dampening means, regardless of some error in an axial position of a spring when a second mechanical spring means is arranged in the belt tensioner, and finally for easily adjusting the spring force to be applied to the dampening means.

Briefly described, in accordance with the present invention, a belt tensioner comprises a support means for being fixed relative to a belt, a belt engaging means carried by the supporting means and being movable relative to the support means, a first urging means operatively associated with the support means and the belt engaging means for urging the belt engaging means against the belt with force to tension the belt, and a frictional dampening means operatively associated with the support means and the belt engaging means to dampen the movement of the belt engaging means relative to the support means in at least one direction of the movement thereof. The support means includes a substrate fixed to a fixed portion and a shaft means, and end of which is fixed to the substrate, having a longitudinal axis.

The belt engaging means is engaged rotatably around the longitudinal axis of the shaft means and has a second longitudinal axis parallel to the first longitudinal axis of the shaft means.

The belt engaging means further comprises a pulley means rotatably supported around the second longitudinal axis and engaged to the belt. The dempening means comprises one or a plurality of holes opening at an edge of a side in which the belt engaging means faces to the substrate of the support means, and being formed in parallel with the longitudinal axis of the shaft means, a friction element stored in the hole or holes movably in a longitudinal direction and being in contact with the surface of the substrate, and an second urging means, stored in the hole or holes and being adjacent to the friction element, for urging the friction element toward the substrate to press the friction element toward the surface of the substrate.

According to the present invention, the dampening means is stored in the hole or holes formed in parallel with the longitudinal axis of the shaft means, so that without prolonging the longitudinal length of the belt tensioner, there can be formed a longitudinal space for storing the dampening means, whereby the second urging means with a long longitudinal size can be used. Therefore, it is unnecessary to enlarge the modulus of elasticity of the second urging means in order to make the urging force of the second urging means great.

Instead, great deformation degree of the second urging means enables the increase of its urging force. Even if the deformation degree of the second urging means may change due to the friction of the friction element or positioning error of the friction element, the urging force of the second urging means remains substantially unchanged, so that substantially constant urging force can be applied to the friction element.

Further, the number of the friction elements and the second urging means to be stored can increase easily by increasing the number of the holes in order to make the friction dampening force greater. As the number of the second urging means increase, the necessary urging force per urging means decreases, so that the modulus of elasticity of the second urging means can be further made small. The urging force of the second urging means is thereby made uniform.

In another preferred embodiment of the present invention, the belt engaging means may comprise a cylinder coupled rotatably around the longitudinal axis of the shaft means, an arm means an end of which is engaged to the cylinder, and a pulley means having a second longitudinal axis parallel with the longitudinal axis of the shaft means, at the other end of the arm, and rotatably supported around the second longitudinal axis and engaged with the belt, to provide such an arrangement of the belt engaging means, the first urging means is preferred to comprise as follows. The first urging means comprise a coil spring provided at the outer side of the cylinder. While an end of the coil spring is engaged to the substrate, the other of the coil spring is engaged to the arm. The engagement position between the arm and the coil spring is near to the second longitudinal axis of the arm. A radial load is continuously applied to the shaft means and the cylinder while the coil spring is being twisted to cause a radial component. As the engagement position between an end of the coil spring and the arm becomes close to the second longitudinal axis of the arm, the radial load reaches zero to reduce the sliding resistance of the cylinder in the belt engaging means.

On the substrate of the support means, there may be provided a spring rest for resting the inner circumference of the coil spring. The spring rest is provided for resting a part or many parts of the inner circumference of the coil spring from a point to the semicircle range corresponding to 180 degrees of the coil spring, an end of the coil spring being engaged to the substrate. With the provision of the spring rest, the coil spring is prevented from getting in contact with the outer circumference of the cylinder in the belt engaging means due to twist deformation of the coil spring. The twist torque characteristics of the coil spring can be very minimized in terms of its hysteresis.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Referring to the accompanying drawing, the present invention will be specifically described in terms of a power transmission belt for an automobile engine.

Figure 1:
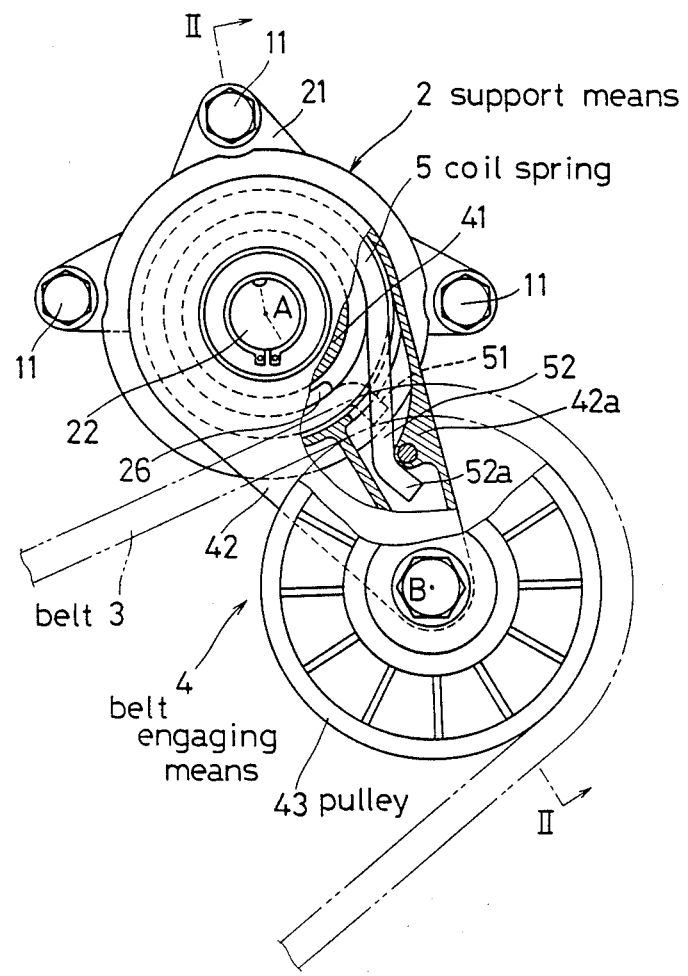
FIG. 1 is a front view, with partially broken, of a belt tensioner according to the first preferred embodiment of the present invention.
Figure 2:
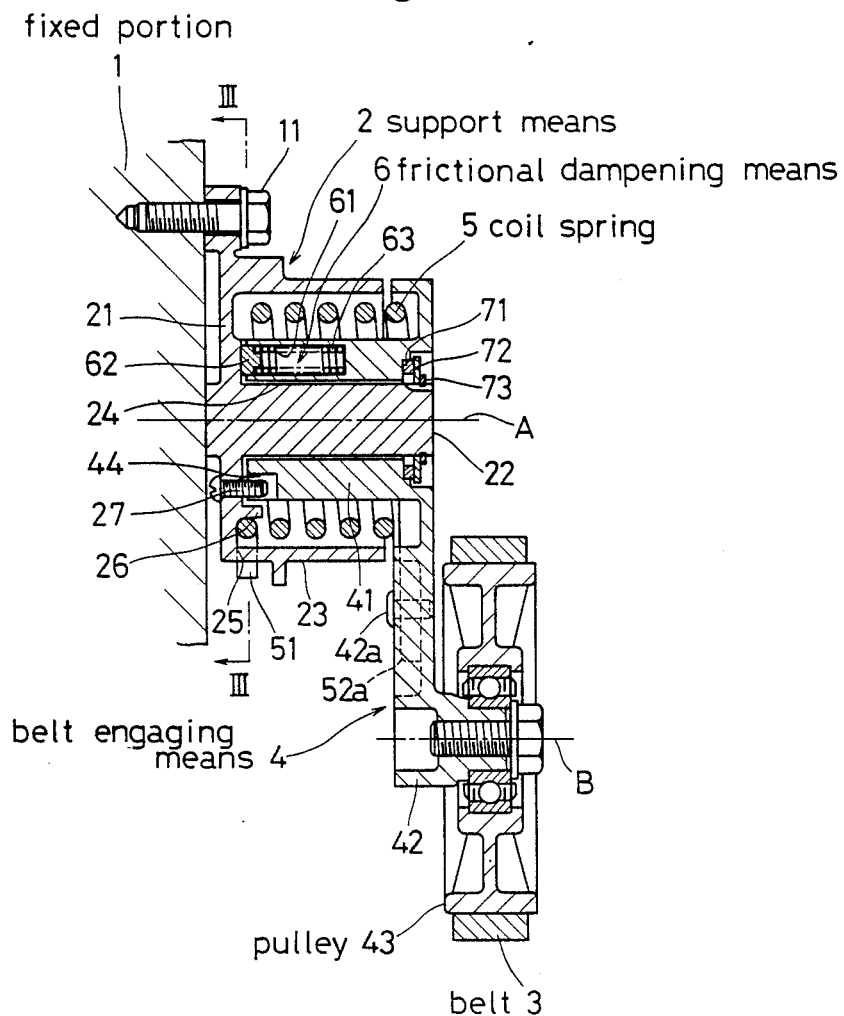
FIG. 2 is a sectional view of FIG. 1 along the line II—II.
Figure 3:
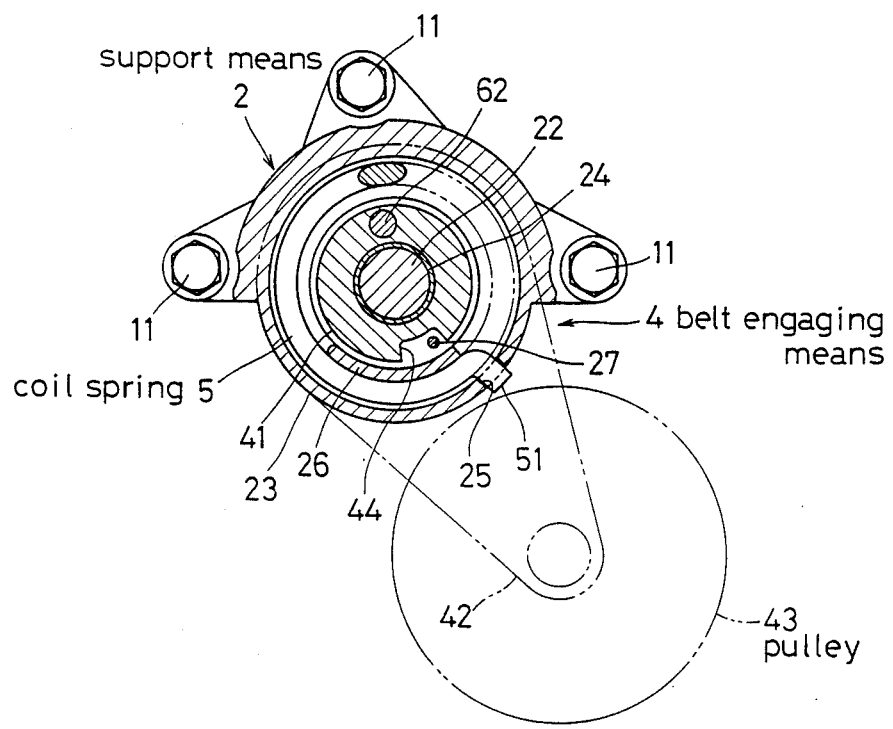
FIG. 3 is sectional view of FIG. 2 along the line III—III.
Figure 4:
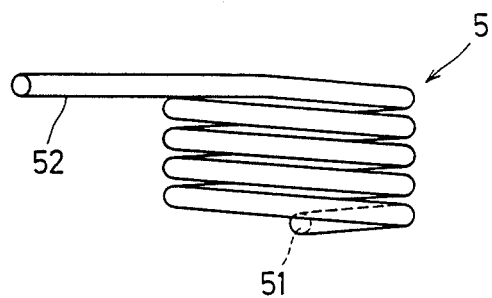
FIG. 4 is a side view of a coil spring used for the belt tensioner of the first preferred embodiment of the present invention.
Figure 5:
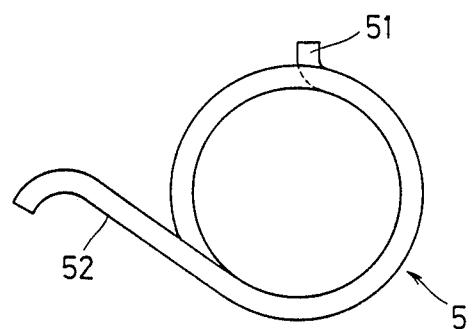
FIG. 5 is a plan view of the coil spring of FIG. 4.
Figure 6:
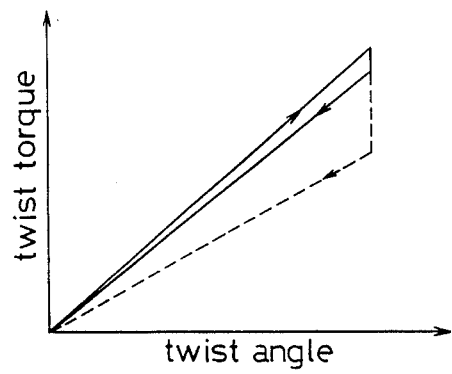
FIG. 6 is a characteristic graph of the twist characteristics of the coil spring as compared with the conventional case.

FIGS. 1 through 3 shown the first preferred embodiment of the present invention and FIGS. 4 and 5 show a coil spring as a first urging means first preferred embodiment. FIG. 6 shows a graph of the twist characteristics of the coil spring as compared with the conventional one. The characterics of the coil spring used for the present invention are denoted by solid line and those of the conventional one are denoted by broken line.

With reference to these drawings, a support means 2 is fixed to a fixed portion 1 of an automobile engine such as an engine block by a bolt 11.

The support means 2 is fixedly related to a belt 3. A belt engaging means 4 is carried by the support means 2 and movable to the support means 2. A coil spring 5 is interposed between the support means 2 and the belt engaging means 4, so that against the tension of the belt 3, the coil spring 5 functions to urge the belt engaging means toward the belt 3. A frictional dampening means 6 is interposed between the support means 2 and the belt engaging means 4, so that the dampening means 6 offers a frictional dampening force against the movement of the belt engaging means 4 with respect to the belt 3. The support means 2 comprises a substrate 21 fixed to the fixed portion 1, a shaft means 22 and end of which is fixed to the substrate 21 and having a longitudinal axis A, and a cylinder case 23 an end of which is fixed to the substrate 21 and provided so as to encompass the shaft means 22.

The belt engaging means 4 includes a cylinder 41 provided rotatably around the outer circumference of the shaft means 22 via a bush 24. The cylinder 41 is prevented from moving off longitudinally by a bush 71, a washer 72 and clip 73 positioned at the tip of the shaft means 22. An arm 42 extends from a portion of the outer circumference of the cylinder 41 radially toward the outer area.

The belt engaging means 4 has a second longitudinal axis B, at the tip of the arm 42, being in parallel with the longitudinal axis A of the shaft means 22. A pulley 43 is rotatably supported around the second longitudinal axis B. The pulley 43 is engaged with the belt 3.

As shown in FIGS. 4 and 5, an end 51 of the coil spring 5 is bent radially and outwardly. The outer end 52 of the coil spring 5 is tangentially extended from the coil spring 5. The coil spring 5 is positioned between the outer circumference of the cylinder 41 and the inner circumference of the cylinder case 23. The end 51 of the coil spring 5 is engaged to an engaging hole 24 provided at an end of the substrate 21 of the cylinder case 23. The other end 52 of the coil spring 5 has a tip 52a engaged with an engagement portion 42a formed near the longitudinal axis B at the tip of the arm 42.

When the belt engaging means 4 is urged to the belt 3, a problem may occur if the contact position (=the longitudinal axis B) between the pulley 43 and the belt 3 is different from the engagement point between the coil spring 5 and the belt engaging means 4. The problem is that a radial load is caused to the bush 24 at which the belt engaging means 4 starts to swing. The bush 24 may be worn out in a short time.

According to the present invention, the tip 52a of the other end 52 in the coil spring 5 is engaged to the engaging portion 42a formed adjacent to the longitudinal axis B at the tip of the arm 42, so that the radial load to be applied to the bush 24 can be reduced. Of course, if the position of engaging portion 42a exactly meets with the longitudinal axis B, any load to be applied to the bush 24 becomes substantially zero. Therefore, the position of the engaging portion 42a is desired to be closed to the longitudinal axis B as much as possible.

A spring rest 26 is provided on the substrate 21 for receiving the coil spring 5. It extends along the circumference direction to rest the inner circumference portions of the coil spring 5 in a range corresponding to 90 degrees starting from the coil spring end 51. Radially, the spring rest 26 is abrupt like a visor.

The spring rest 26 can stop any bending of a piece of spiral of the coil spring 5 due to twist deformation to the inner side. The coil spring 5 is prevented from bending toward its inner side and eventually getting in contact with the outer circumference of the cylinder 41. Therefore, as shown in FIG. 6, the magnitude of the hysteresis of the twist torque characteristics of the coil spring 5 can be made small as compared with the conventional one, so that the twist torque characteristics of the coil spring 5 can be improved. The frictional dampening means 6 has a hole 61 at the end of a side facing the substrate 21 of cylinder 41. The hole 61 is formed in parallel with the longitudinal axis A of the shaft means 22. In this preferred embodiment, there is a single hole 61. Within the hole 61, a frictional element 62 and compressed coil spring 63 are stored longitudinally and movably. The compressed coil spring 63 is stored adjacent to the frictional element 62 and at the inner most of the hole 61.

Then, the compressed coil spring 63 urges the frictional element 62 toward the substrate 21 to press the frictional element 62 to the surface of the substrate 21. With the frictional between the substrate 21 and the frictional element 62, some frictional force is applied to the swing movement between the support means 2 and the belt engaging means 4. The friction between the substrate 21 of the support means 2 and the frictional element 62 can be readily selected by changing the number of the frictional dampening means 6, the material of the frictional element 62 or the substrate 21, or the spring force of the compressed coil spring 63.

A stopper bolt 27 is fixed to the substrate 21 and abrupt in parallel with the longitudinal direction of the shaft means 22. When the tip of the stopper bolt 27 is engaged to a cut-away 44 formed in an end facing the substrate 21 of the cylinder 41, the swing zone of the belt engaging means 4 is regulated.

Figure 7:
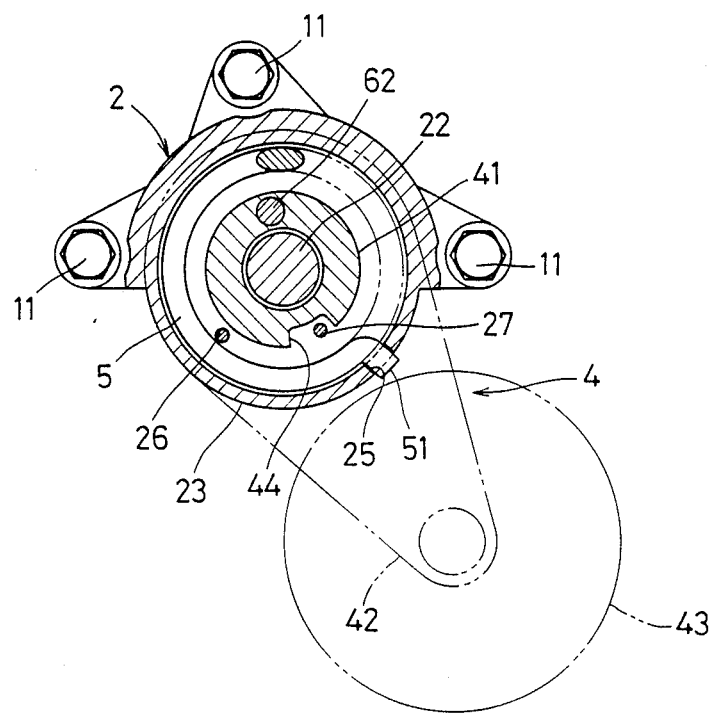
FIG. 7 is a traverse sectional view of a belt tensioner according to the second preferred embodiment of the present invention, corresponding to FIG. 3.

In the first preferred embodiment, the spring rest 26 is formed as a single visor projected circumferentially. There may be arranged a plurality of projections in a circumferential shape. Further, as shown in FIG. 7, a spring rest projection 126 may be provided for resting a portion of circumference parts of the coil spring 5, the portion exists far from the coil spring end 51 about 90 degrees. Any shape of the spring rests 26 and 126 may be possible as far as they can rest the portion or entire parts of the inner circumference of the coil spring 5 in a range corresponding 180 degrees starting from the coil spring end 51 of which is engaged to the substrate 21.

Like elements corresponding to those of FIGS. 1 through 3 are denoted by like reference numbers.

Figure 8:
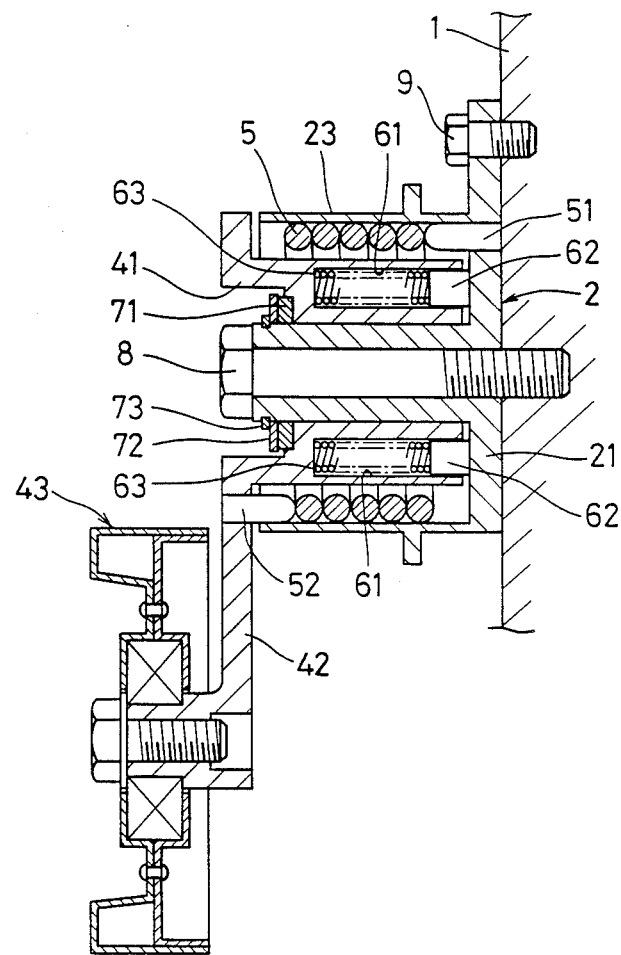
FIG. 8 is a traverse sectional view of a belt tensioner according to the third preferred embodiment of the present invention, corresponding to FIG. 2.

FIG. 8 shows the third preferred embodiment of the present invention in which there are provided two frictional dampening means 16 in parallel with the longitudinal axis A in an opposed position by 180 degrees. In this preferred embodiment, a through hole is formed in the shaft means 22 in which a bolt 8 is inserted. The bolt 8 is provided in the fixed portion 1 to fix the substrate 21 to the fixed portion 1. A bolt 9 illlustrated in FIG. 8 serves to prevent the substrate 21 from rolling. Other elements function as described in FIGS. 1 through 3. Like elements are denoted by like numerals. In the third preferred embodiment, there are provided two frictional dampening means 16 to enlarge the dampening force more than the other preferred embodiments. To provide the same dampening force as the other embodiments, the modulus of the compressed coil springs 63 can be reduced to be one-half of the springs 63 in the other embodiments. This can reduce the variations in the spring forces due to the variations of the deformation degrees of the spring.

While only certain embodiments of the present invention have been described, it will be apparent to those skilled in the art that various changes and modifications may be made therein without departing from the spirit and scope of the present invention as claimed.

What is claimed is:

1. A belt tensioner comprising:

support means for being fixed relative to a belt;

belt engaging means carried by said support means and being movable relative to said support means;

first urging means operatively associated with said support means and said belt engaging means for urging said belt engaging means against said belt with a force to tension said belt;

frictional dampening means operatively associated with said support means and said belt engaging means to dampen the movement of said belt engaging means relative to said support means in at least one direction of the movement thereof;

said support means comprising a substrate fixed to a fixed portion and shaft means, and end of which is fixed to said substrate, having a first longitudinal axis;

said belt engaging means being carried rotatably around said first longitudinal axis of said shaft means, and having a second longitudinal axis parallel to said first longitudinal axis of said shaft means, and pulley means rotatably supported around said second longitudinal axis and engaged to said belt; and said frictional dampening means comprising one or a plurality of holes opening at an edge of a side in which said belt engaging means faces to said substrate of said support means, and being formed in parallel with said first longitudinal axis of said shaft means, a friction element stored in said hole or holes movably in a longitudinal direction and being in contact with the surface of said substrate, and second urging means, stored in said hole or holes and being adjacent to said friction element for urging said friction element toward said substrate.

2. The belt tensioner of claim 1, wherein said belt engaging means further comprises a cylinder coupled rotatably around said first longitudinal axis of said shaft means, arm means an end of which is engaged to said cylinder, and pulley means having second longitudinal axis parallel with said first longitudinal axis of said shaft means, at the other end of said arm, and rotatably supported around said second longitudinal axis and engaged with said belt.

3. The belt tensioner of claim 2, wherein said first urging means further comprises a coil spring provided at the outer circumference of said cylinder, an end of said coil spring being engaged to said substrate and the other end of said coil spring being engaged to said arm, so that the engagement position between said arm and said coil spring is near to said second longitudinal axis of said arm.

4. The belt tensioner of claim 1, wherein said first urging means further comprises a coil spring, and there is further provided a spring rest on said substrate of said support means for resting a portion of entire parts of the inner circumference of said coil spring in a range corresponding 180 degrees starting from said coil spring end of which is engaged to said substrate.

5. Thef belt tensioner of claim 1, wherein said second urging means comprises a coil spring means or a plurality of coil spring means.

* * * * *